No. 813,910. PATENTED FEB. 27, 1906.
J. R. McCLELLAN.
SAW ROUNDING AND JOINTING ATTACHMENT.
APPLICATION FILED JAN. 19, 1905.
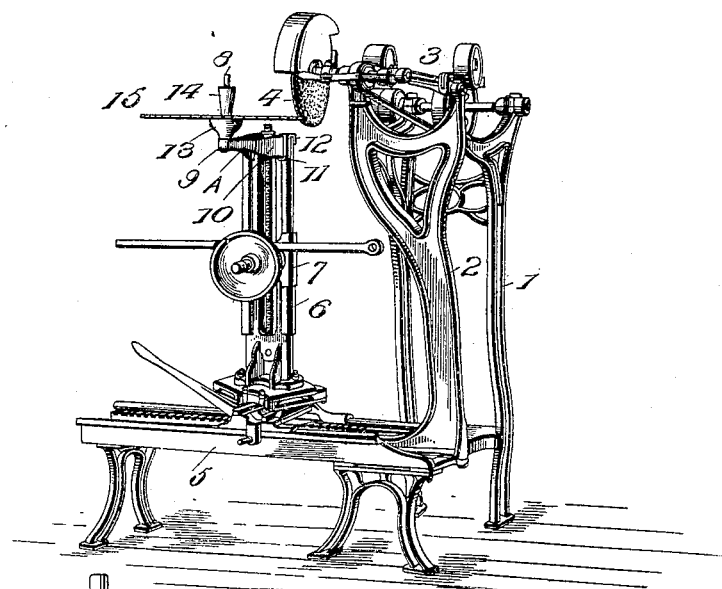
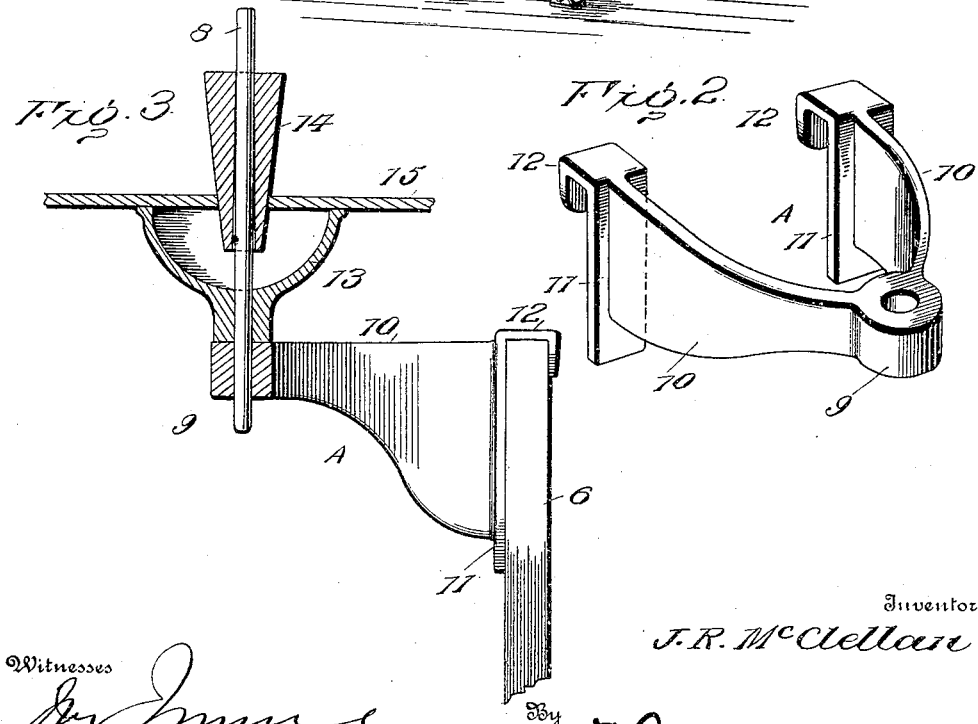
Inventor
J. R. McClellan
Witnesses
By
R. A. P. Lacey, Attorneys

UNITED STATES PATENT OFFICE.

JAMES R. McCLELLAN, OF MEDINA, WISCONSIN.

SAW ROUNDING AND JOINTING ATTACHMENT.

No. 813,910.  Specification of Letters Patent.  Patented Feb. 27, 1906.

Application filed January 19, 1905. Serial No. 241,879.

*To all whom it may concern:*

Be it known that I, JAMES R. MCCLELLAN, a citizen of the United States, residing at Medina, in the county of Outagamie and State of Wisconsin, have invented certain new and useful Improvements in Saw Rounding and Jointing Attachments, of which the following is a specification.

This invention appertains to mechanism for rounding and jointing circular saws, and relates more particularly to an attachment whereby one is enabled to joint circular saws and preserve a true circular outline, which is essential to uniformity of work and a steady motion when the machine is in operation.

The invention provides an attachment which may be readily applied to any make of saw-sharpening machine with slight changes rendered necessary in adapting the same to the different makes and designs of saw-sharpeners.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of a circular-saw-sharpening machine having the attachment in position. Fig. 2 is a detail perspective view of the bracket. Fig. 3 is a sectional view of parts of the attachment, showing their relative arrangement when a saw is in place to be jointed.

Corresponding and like parts are referred to in the following description and indicated in all the views of the drawings by the same reference characters.

The machine illustrated is of ordinary construction such as commonly provided for sharpening circular saws and comprises standards 1 and 2, counterbalanced frame 3, carrying grinding disk or wheel 4, bed 5, vertical guide 6, adjustable on the bed 5, and saw-carrier 7, adjustable vertically on the guide 6.

In accordance with this invention a vertical spindle 8 is provided and is let into a sleeve or collar 9 of a bracket A. Diverged arms 10 project from the sleeve 9 and terminate in plates 11, having hooks 12 at their upper ends to engage over the upper end of the guide 6, as shown most clearly in Fig. 2. The spindle 8 is fitted into the vertical opening of the sleeve or collar 9 and is adapted to receive a bowl-shaped support 13 and a tapered centering-piece 14, the latter snugly fitting the spindle 8 and adapted to enter the center opening of the saw 15 to be jointed, so as to prevent any play thereof of the spindle and insure its movement about a vertical axis. By mounting the bracket A upon the guide 6 it may be adjusted toward and from the grinding-wheel 4, according to the diameter of the saw, whereby provision is had for jointing saws of different diameters.

The saw 15 to be jointed is slipped upon the spindle 8 and rests upon the bowl-shaped support 13, after which the centering-piece 14 is placed upon the upper portion of the spinde 8 and moved thereon until its lower end snugly fits the center opening of the saw, thereby centering the latter with reference to the spindle. The bracket A is moved to a position by adjusting the guide 6 on the bed 5 to cause the extremities of the saw-teeth to just touch a side of the grinding-wheel 4, when said bracket may be held in the located position by any means and the saw 15 turned about the spindle 8 to bring the teeth thereof in contact with the grinding-wheel, so as to insure perfect jointing or circular conformation of the teeth in the manner well understood. The guide 6 may be designated as a movable support for the bracket A.

Having thus described the invention, what is claimed as new is—

The herein-described circular-saw-jointing attachment comprising a bracket consisting of diverged arms, plates at the inner ends of the arms having hooks at their upper ends and a collar at the converged ends of the arms having a vertical opening, a spindle fitted in the opening of the collar, and a tapered centering-piece and bowl-shaped support slipped upon said spindle.

In testimony whereof I affix my signature in presence of two witnesses.

JAMES R. McCLELLAN. [L. S.]

Witnesses:
E. W. BREYER,
O. SHOFELT.